US007454362B1

(12) United States Patent
Hayes et al.

(10) Patent No.: US 7,454,362 B1
(45) Date of Patent: Nov. 18, 2008

(54) METHOD AND SYSTEM FOR DYNAMICALLY PROVIDING MATERIALS AND TECHNOLOGY INFORMATION

(75) Inventors: Robert D. Hayes, Poughkeepsie, NY (US); E. Kobeda, Raleigh, NY (US); John S. Maresca, Hopewell Junction, NY (US); Michael J. Whitney, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2022 days.

(21) Appl. No.: 09/711,777

(22) Filed: Nov. 9, 2000

(51) Int. Cl.
G06F 17/30 (2006.01)
(52) U.S. Cl. .......................... 705/10; 707/200
(58) Field of Classification Search ................ 705/7, 705/10; 707/200
See application file for complete search history.

(56) References Cited

U.S. PATENT DOCUMENTS

| | | | | |
|---|---|---|---|---|
| 5,630,125 | A * | 5/1997 | Zellweger | 707/103 R |
| 5,694,546 | A * | 12/1997 | Reisman | 705/26 |
| 5,765,138 | A * | 6/1998 | Aycock et al. | 705/7 |
| 5,781,911 | A | 7/1998 | Young et al. | |
| 6,023,683 | A | 2/2000 | Johnson et al. | |
| 6,122,560 | A | 9/2000 | Tsukishima et al. | |
| 6,125,388 | A * | 9/2000 | Reisman | 709/218 |
| 6,154,738 | A * | 11/2000 | Call | 707/4 |
| 6,295,513 | B1 * | 9/2001 | Thackston | 703/1 |
| 6,574,638 | B1 * | 6/2003 | Gustman et al. | 707/104.1 |
| 6,611,862 | B2 * | 8/2003 | Reisman | 709/217 |
| 6,704,740 | B1 * | 3/2004 | Lang | 707/102 |
| 6,751,600 | B1 * | 6/2004 | Wolin | 706/12 |

OTHER PUBLICATIONS

Bates et al. "Lotus Notes in action: Meeting corporate information needs," Database, Aug. 1994.*
Jefferson, Steve. "Cut and paste your way to a powerful prototype," Datamation, Oct. 1997.*
"Lotus LearningSpace: new ground," T H E Journal, Dec. 1996.*
"Data conversion, extraction and migration. (1996 Database Buyer's Guide and Client/Server Sourcebook)," DBMS, Jun. 15, 1996.*
Edelstein, Herb. "Distributed DBMS," Computerworld, Nov. 4, 1991.*
Lam et al. "Roles of resources and data contention on the performance of replicated distributed database systems," Journal of Database Management, Winter 1993.*

* cited by examiner

*Primary Examiner*—Catherine Tarae
(74) *Attorney, Agent, or Firm*—Cantor Colburn LLP; Derek S. Jennings

(57) ABSTRACT

An exemplary embodiment of the invention relates to a computer-based method and system for gathering materials and technology information from internal as well as external sources, integrating the information into a format accessible to disparate systems, storing the information in a centralized system, updating the stored information as needed, and providing continuous access to the information for authorized users of the system. The Development Toolkit Network (DTN) of the present invention is a set of applications designed to facilitate the gathering of technical information about supplier product offerings, and to disseminate that information to an organization's development engineers around the globe.

77 Claims, 9 Drawing Sheets

DATA INPUT FLOW: SUPPLIER

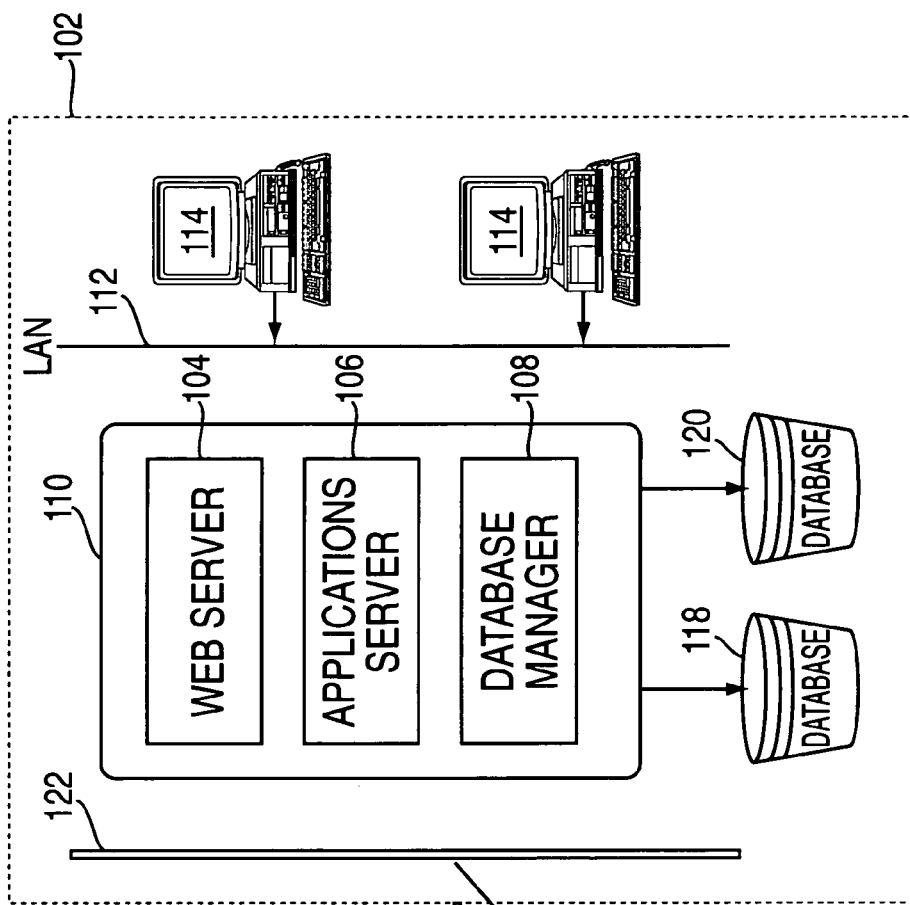
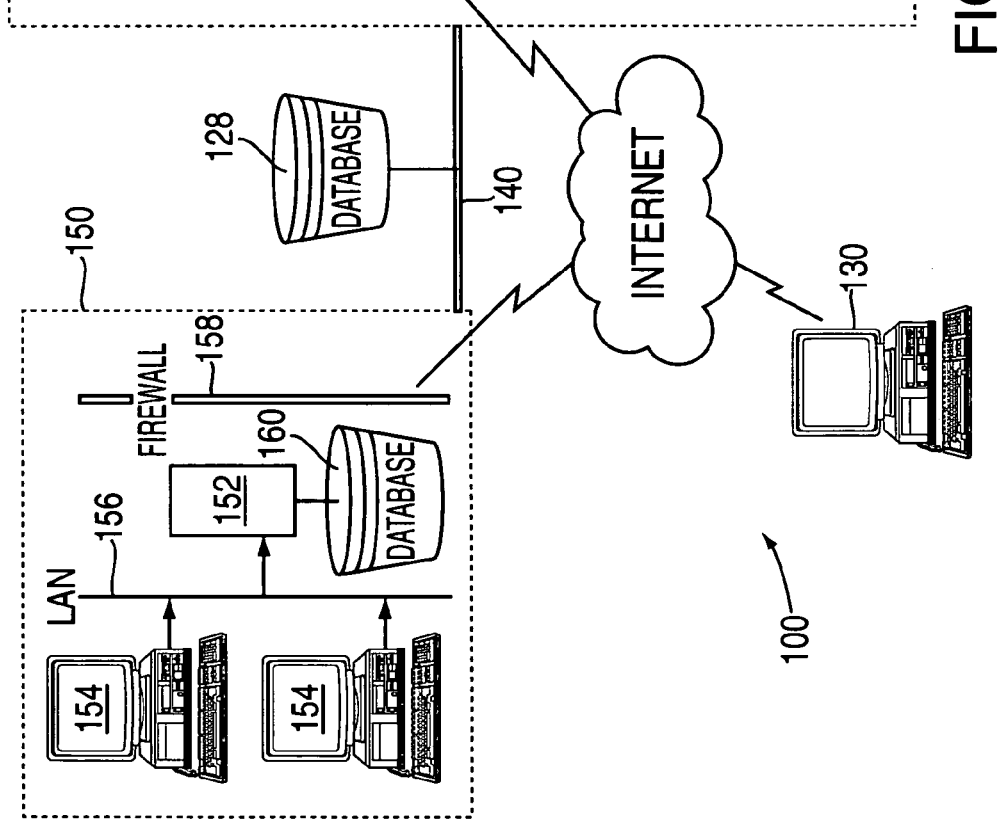
FIG. 1

USER FLOW: DEVELOPMENT ENGINEER

Technology Survey

Connector Technology Survey

| | |
|---|---|
| Supplier Name | ▫ |
| Supplier's name for this product family | ⁏Z-Pack (test)⌐ |
| Contact person | ⁏ ⌐ |
| Phone number | ⁏999-999-9999 ⌐ |
| URL for general family information | ⁏http:// |
| URL for qualification test report and data | ⁏http:// |
| Descripion | ⁏CompactPCI standard ⌐ |
| General comments | ⁏SAMPLE ENTRY-TEST⌐ |
| Description of attached files (attachments appear at bottom of page) | |
| List/ describe relevent industry standards | ⁏CompactPCI ⌐ |
| feedback to supplier | ⁏ ⌐ |

General Information

| | |
|---|---|
| Class (category) | Backplane Connectors |
| Family name | ⁏CompactPCI▫ |

FIG. 7

DATA INPUT FLOW: SUPPLIER

METHOD AND SYSTEM FOR DYNAMICALLY PROVIDING MATERIALS AND TECHNOLOGY INFORMATION

BACKGROUND

This invention relates generally to a computer-based method and system, and more particularly, this invention relates to a computer-based method and system for dynamically providing materials and technology information to authorized system users. During the planning phase for a new product, development engineers seek out information pertaining to production materials and related technology that exist in the market and that will produce optimum economic and structural benefits for their product. In a typical organization, information regarding product materials and technology is often gathered by these development engineers in a haphazard fashion through the use of various supplier catalogs, telephone inquiries, and by word-of-mouth. As can be expected, some suppliers and some engineers may be less effective in gathering this information than others, often leading to poor decisions and other inefficiencies based on incomplete or out-of-date information. Procurement engineers, who are generally available to help guide development engineers through these selection decisions. However, procurement engineers are often unable to help with all technology selection decisions due to limited resources.

A process is therefore required that can provide a means of gathering materials and technology information from a variety of sources and that allows continuous, 24-hour access for authorized persons around the globe.

BRIEF SUMMARY

An exemplary embodiment of the invention relates to a computer-based method and system for gathering materials and technology information from internal as well as external sources, integrating the information into a format accessible to disparate systems, storing the information in a centralized system, updating the stored information as needed, and providing continuous access to the information for authorized users of the system. The development toolkit network (DTN) of the present invention is a set of applications designed to facilitate the gathering of technical information about supplier product offerings and new technology, and to disseminate that information to an organization's development engineers around the globe. In the quickly changing electronics industry, this can mean disseminating information very early, such as, while products are still in the development stage. The DTN tool is designed to assist development engineers in materials and technology selection, by providing a graphical, easy-to-navigate set of information in real-time.

BRIEF DESCRIPTION OF THE DRAWINGS

Referring now to the drawings wherein like elements are numbered alike in the several FIGURES:

FIG. 1 is a block diagram of a portion of the system that includes a plurality of workstations and servers on which the DTN tool is implemented;

FIG. 7 is a sample technology survey response screen window for a chosen technology family in the backplane connector technology;

DETAILED DESCRIPTION OF THE PREFERRED EMBODIMENT

Figure 2:
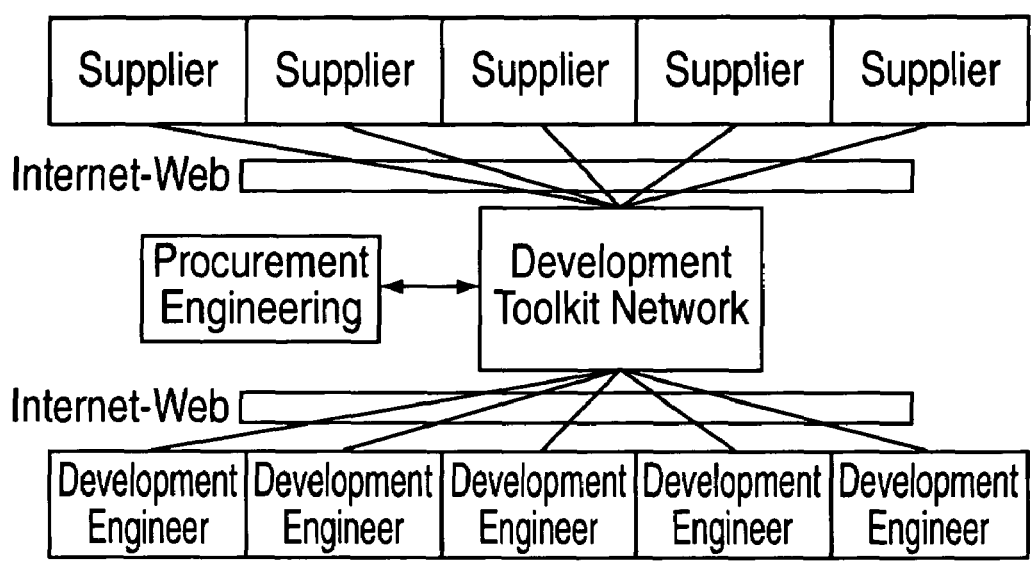
FIG. 2 is a diagram illustrating the flow of technology information among development engineers, procurement engineers, and suppliers utilizing the DTN tool.

In an exemplary embodiment, the DTN application is implemented through a networked system such as that shown in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes an organization 102 comprising a web server 104, an applications server 106, and a database server 108 that are located on a host system 110 and connected through a network 112 to workstations 114. The term "organization" refers to the system implementing the development toolkit network (DTN) applications. Network 112 may comprise a LAN, a WAN, or other network configuration known in the art. Further, network 112 may include wireless connections, radio-based communications, telephony-based communications, and other network-based communications. For purposes of illustration, however, network 112 is a LAN. A firewall 122 limits access to organization 102 to those network users possessing proper access permissions.

Host system 110 is running suitable web server software designed to accommodate various forms of communications, and which allows information in data storage devices 118 and 120 to be published on a web site. For purposes of illustration, host system 110 is running Lotus Domino (TM) as its server software. Applications server 106 executes the DTN tool, among other applications utilized by organization 102. Applications server 106 is also running a groupware application such as Lotus Notes (TM) which allows remote users to access information through its replication capabilities, provides e-mail services, and supports a secure extranet architecture.

Data storage devices 118 and 120 reside within intranet 112 and may each comprise any form of mass storage device configured to read and write database type data maintained in a file store (e.g., a magnetic disk data storage device). Data storage devices 118 and 120 are logically addressable as consolidated data sources across a distributed environment such as a network system 100. The implementation of local and wide-area database management systems to achieve the functionality of data storage devices 118 and 120 will be readily understood by those skilled in the art. Information stored in data storage devices 118 and 120 is retrieved and manipulated via database server 108.

Data storage device 118 provides a repository for a variety of information and stores the front end and engineering notebook databases of the DTN tool. A second data storage device 120 houses the technology surveyss database of the DTN tool. All three features are further described herein.

System 150 comprises a web server 152 that connects workstations 154 to an intranet 156 and to the Internet. Firewall 158 provides security and protection against unauthorized access to internal network information from outside sources. Each of workstations 154 may access web server 152 via internal web browsers (not shown) located on workstations 154. A data storage device 160 is coupled to server 152. A replica 128 of the technology surveyss database from data storage device 120 is accessible to system 150 via extranet 140. System 150 is typically an existing or prospective supplier of organization 102.

The DTN tool is a set of e-business applications that provides an environment for storing the supplier knowledge that procurement engineers have, and allows constant access to development engineers around the world. Suppliers also have 24-hour access to submit supplier surveys to educate the organization about new technology offerings and changes to existing technology. All suppliers have the same access to the tool, and this competitive situation provides an incentive for them to keep their information up-to-date.

Procurement engineers of organization 102 have access to the DTN tool both in their office and while traveling by using a replica of the Lotus Notes (TM) databases from data storage devices 118 and 120. Whenever new information is discovered, the engineer can edit the information via the DTN tool, usually stored in a web browser program, and replicate it at his/her earliest convenience using dial-up access to organization 102. Additionally, web server 104 may be programmed to systematically conduct scheduled replications, whereby database replicas are temporarily stored in a queue awaiting replications (not shown). Replications may be scheduled by organization 102 as frequently as desired in order to provide access to the most current, up-to-date information. Procurement engineering also uses the DTN tool to educate development engineers about the organization's strategic direction through the use of the technology roadmaps tool (described further in FIG. 5), and may provide markings designating "preferred" technologies and suppliers (further described in FIG. 6). The development engineer has access to DTN via the organization's corporate internet, or intranet 112, using a standard web browser (not shown).

The goal of the DTN tool is to provide access to the most complete, up-to-date information regarding product offerings for authorized users, facilitating a better understanding of market and technology trends. The DTN tool achieves this through its three interlinked subcomponents: the DTN front end feature, the engineering notebook feature, and technology surveys feature.

The DTN tool includes three separate Lotus Notes (TM) databases that reside on data storage devices 118 and 120, and acts as a gateway into many other forms of information. The DTN front end and engineering notebook databases reside in data storage device 118, while the technology surveys database resides in data storage device 120. Both data storage devices 118 and 120 reside within the organization's intranet 112. Since they are within the intranet, they are accessible to all of the organization's employees who have proper access permissions. These databases can be replicated to portable devices, such as laptop computer 130 of FIG. 1, allowing access to information while traveling. The technology survey feature of the DTN tool provides two replicas of the same database. As stated earlier, the first replica of the technology survey database resides in data storage device 120 and is inside the organization's firewall 122, on intranet 112, for access to the organization's employees. The other replica 128 is accessible through the organization's extranet 140 to authorized suppliers. Many replicas may be necessary and will depend upon the number of authorized systems or suppliers requiring access to organization's 102 information. Administration of security and access is controlled through a gateway application capable of integrating disparate data and applications in a secure fashion, such as IBM's Electronic Supply Chain (ESI) Interlock tool, which is described in U.S. patent application Ser. No. 09/658,257, filed on Sep. 8, 2000, and is incorporated herein by reference in its entirety.

A framework for the flow of information associated with the DTN tool is described from the point of view of three types of system users: development engineering personnel (also referred to as 'user'); procurement engineering personnel, the technical experts who provide analysis and comments on materials and technology; and supplier representatives, who provide the technical raw data. This flow of information is systematically integrated and organized via the DTN tool as shown generally in FIG. 2.

Figure 3:
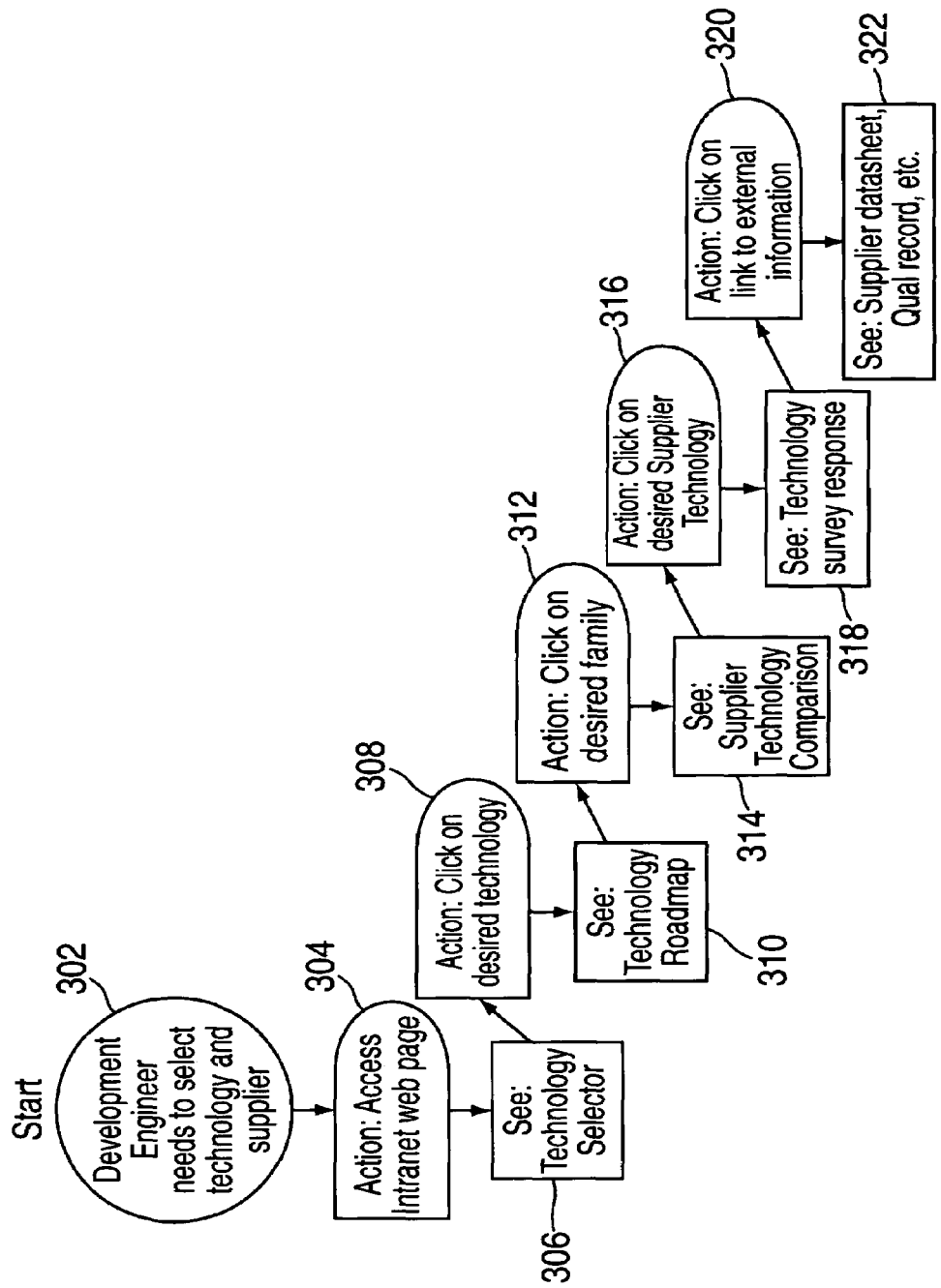
FIG. 3 is a flowchart describing how a development engineer utilizing the DTN tool acquires supplier and technology information.
Figure 4:
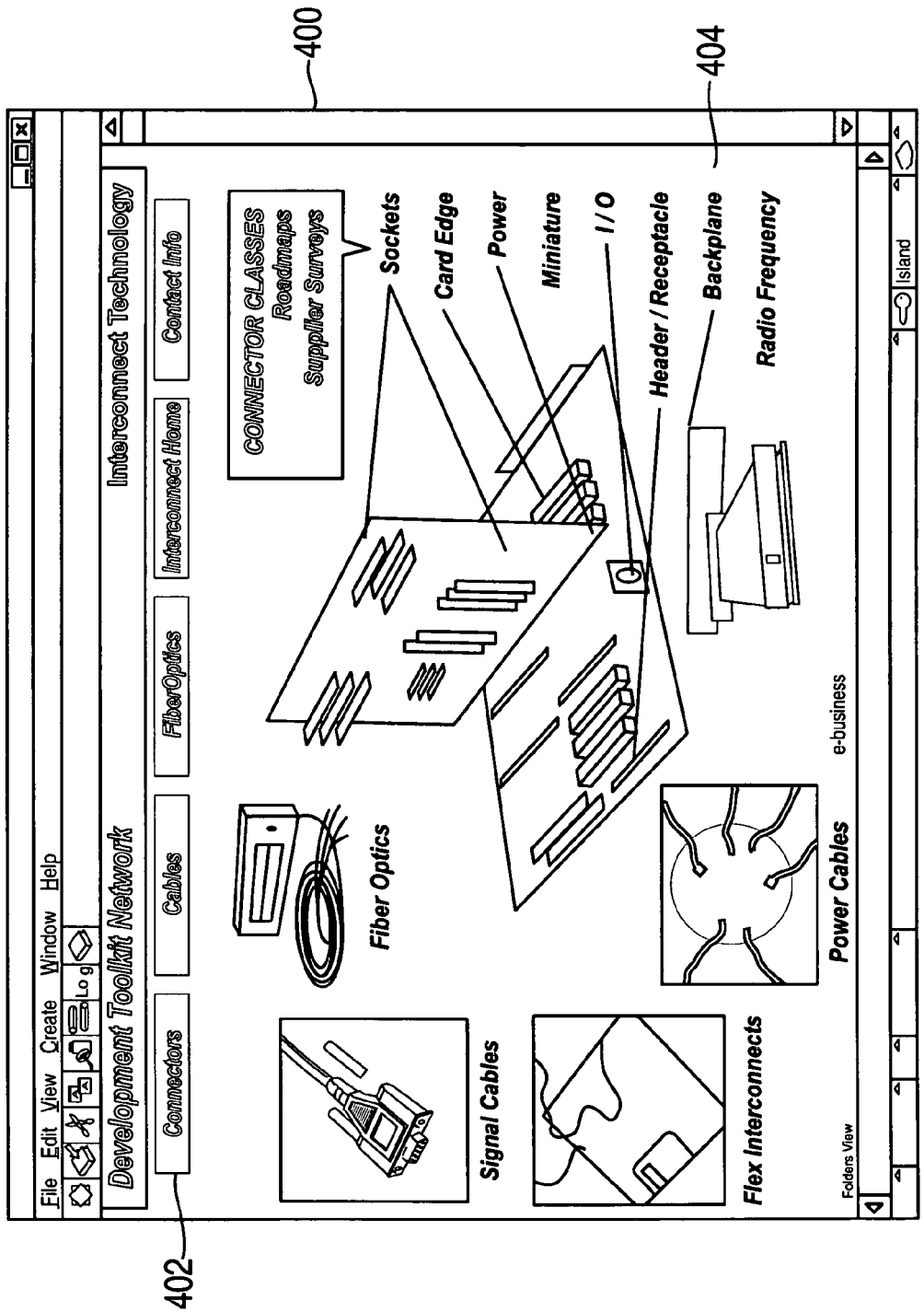
FIG. 4 is a sample technology selector screen window provided by the DTN front-end database.
Figure 5:
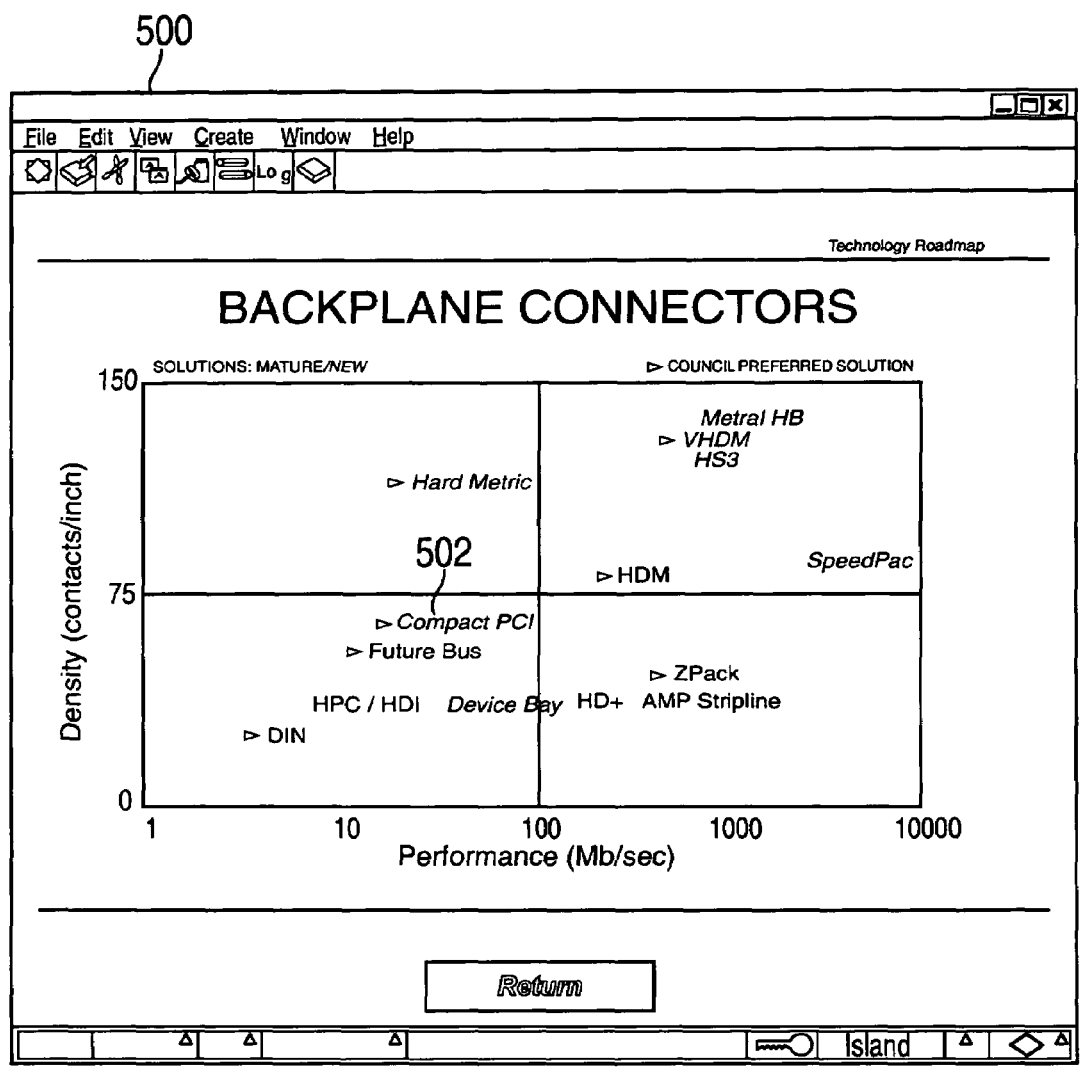
FIG. 5 is a sample technology roadmap screen window provided by the DTN engineering notebook database and illustrates backplane connector technology items.

The flow of information from the development engineering point of view is described in FIG. 3. A development engineer ('user') accesses the DTN tool because of a need for supplier and/or technology information at step 302. For example, a new system under development may require backplane connector technology. The user accesses the organization's intranet web page at step 304, selects the DTN tool icon which, in tune, causes the DTN tool to query the front end database resulting in the technology selector window 400 of FIG. 4 to be displayed at step 306. The user then selects the connectors option 402 from the technology selector window 400 at step 308. The technology selector window is designed from a user's point of view, to make the selection process visual and simple. The user then clicks on 'Backplane' 404 and flow proceeds to step 310 where the user is transferred over to the DTN engineering notebook's technology roadmap database located in data storage device 118. FIG. 5 illustrates a typical technology roadmap window 500, a component of the part and supplier selection process. The technology roadmap feature of the DTN tool both provides users with important summary information about a specific technology as well as information concerning "preferred" technologies for future consideration in order to encourage common technology selection among the different users of organization 102.

Figure 6:
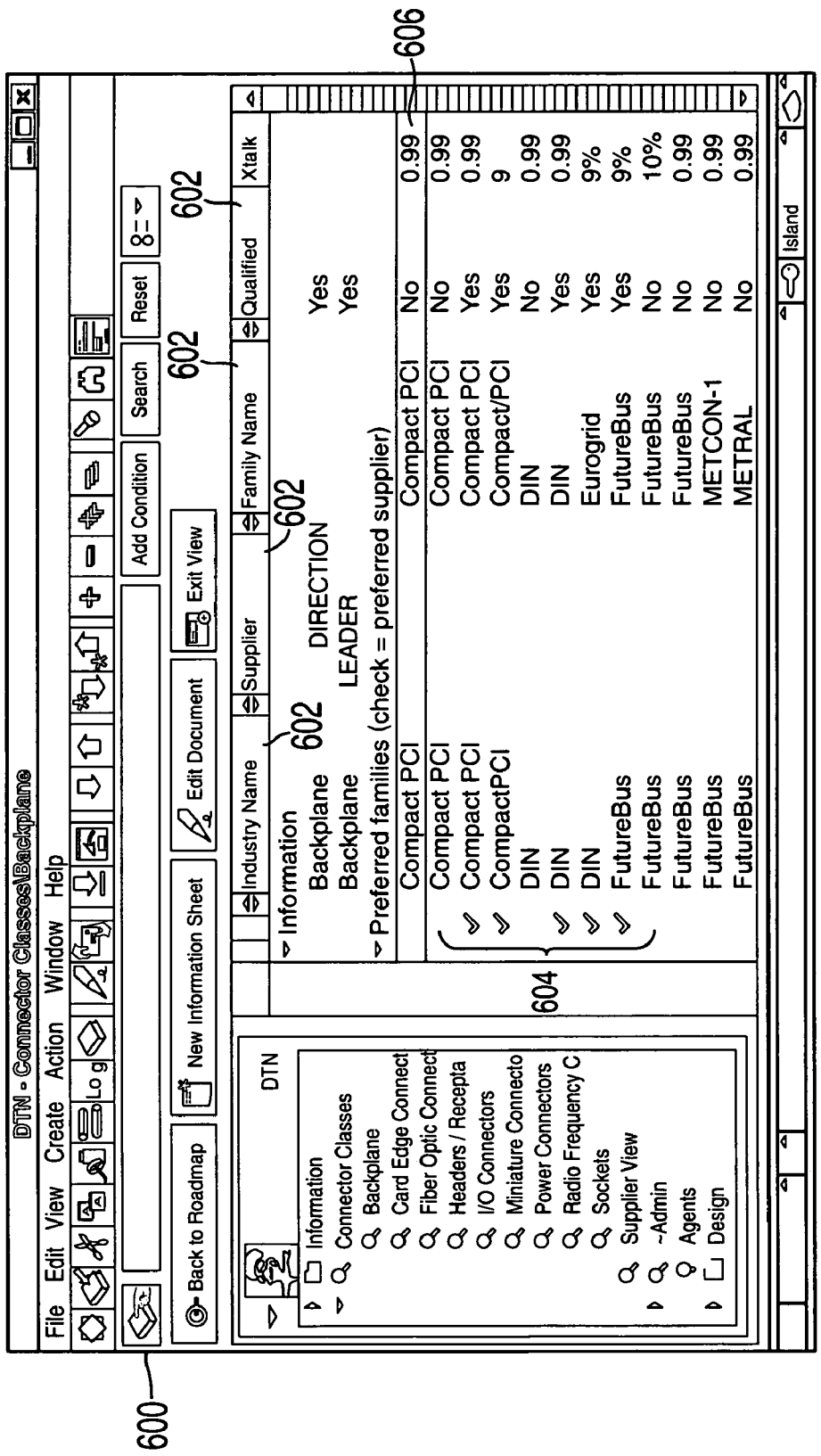
FIG. 6 is a sample supplier technology comparison screen window provided via the DTN supplier survey database and illustrates a technology family in the backplane connector technology.

Using the technology roadmap of the DTN tool, a development engineer compares the listed technologies in terms of performance (density and speed); relative age in the industry (mature versus new); and recommendation of procurement engineering (preferred families) as shown generally in FIG. 5. This information is gathered from a variety of sources and is described further herein. Using this information, a user will click on their chosen technology family 502 from the technology roadmap window 500 at step 312. The technology survey comparison window 600 of FIG. 6 appears at step 314. The user has now left the DTN engineering notebook database in data storage device 118 and has entered the DTN technology survey database in data storage device 120, although the transition was transparent to the user. The technology survey comparison window 600 of FIG. 6 shows back-to-back comparison of the chosen technology as available from each supplier that has filled out a technology survey entry. The information presented on technology survey comparison window 600 includes important performance parameters 602 for the particular technology, in compact form allowing for comparisons of the supplier capabilities to be made. Also shown in FIG. 6 is input from procurement engineering personnel in the form of check-marks 604 which appear next to designated, or preferred, suppliers. This allows users to determine the opinions of the procurement experts who work with these suppliers and rate their prices and performance criteria. Check marks 604 can be displayed in a different color to further distinguish preferred suppliers and/or preferred technology families.

A user desiring to lean more information about a particular item or component for a given supplier can click on the appropriate line entry from window 600. For example, a user desiring additional information selects line 606 at step 316. The technology survey response window 700 of FIG. 7 is then displayed at step 318 which details the complete supplier technology survey response for the selected line 606. The survey contains responses to a set of technical questions that are common and easily comparable between suppliers and is further described in FIG. 8 below. The question set will necessarily vary from technology to technology. Some of the items on the technology survey response window 700 provide URLs 702 linking a user to supplier web sites and further sources of information. The user can click on the desired link 702 at step 320. The information provided by linking to the supplier's URL may be in the form of datasheets or qualification data (step 322). At any time, the user may use the "Back" button on the browser window to view different suppliers, families, or technologies (not shown).

Figure 8:
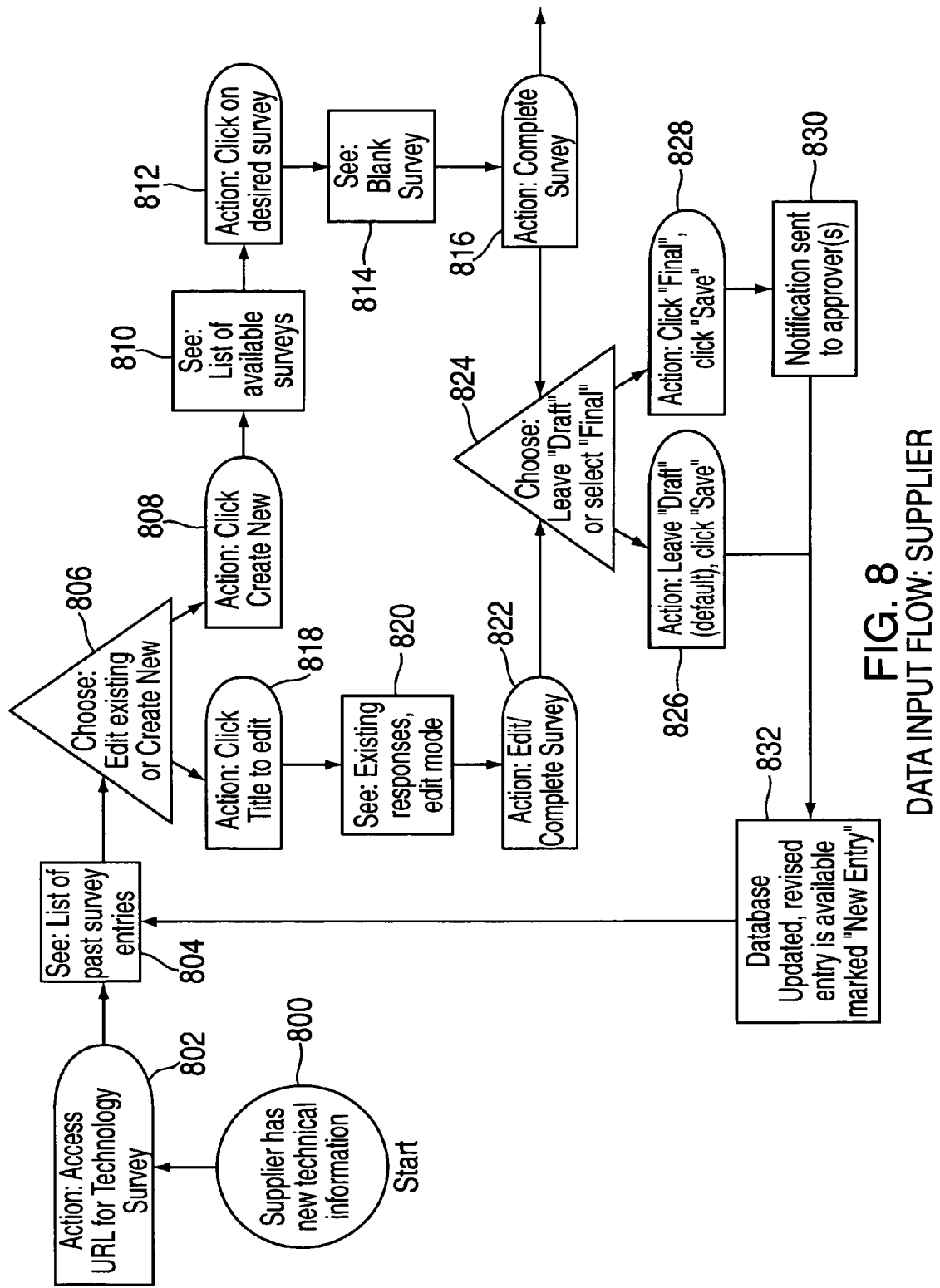
FIG. 8 is a flowchart describing how a supplier utilizing the DTN tool submits a technology survey.

FIG. 8 describes the information flow from the point of view of a supplier utilizing the DTN tool. As described above, suppliers provide information relating to product offerings via supplier technology surveys. Suppliers access the supplier technology survey through the organization's extranet 140 of FIG. 1. The organization's extranet enables secure supplier interaction via the Electronic supply-chain Interlock (ESI) application described above which is used in conjunction with the DTN tool and provides access capabilities such that a supplier need only have one password and deal with one administrative center.

Access to the technology surveys database is initiated when a supplier representative has new information that he would like to share with the organization (step 800), or when someone within the organization requests the information. Suppliers at step 150 may be requested by organization 102 to complete one survey entry for each technology family that they offer. Suppliers are furthermore asked to complete survey entries for technologies that are still in development and/or conception.

FIG. 8 described how a supplier submits information to organization 102 via the technology surveys database 128. First, the supplier enters the URL for organization 102 via workstation 154 at step 802. This URL was given to the supplier representative during registration through ESI. After entering a user name and password, the supplier is allowed to access the organization's extranet 140. A replica database 128 of the technology surveys database stored in data storage device 120 is now available to the supplier at enterprise system 150. Replica database 128 may be structured to provide limited access and editing abilities to enterprise system 150. Once database 128 is accessed, the supplier is then presented with a 'view' of all previously completed survey entries by anyone from system 150 at step 804. At this point the supplier is given the option to either view an existing entry or submit a new one at step 806.

To create a new entry, the supplier clicks on the "Create New" button at step 808, and a supplier letter is displayed (not shown) at step 810. The letter contains basic help information and a list of available surveys at the bottom of the page. When the supplier user clicks on the desired survey at step 812, a survey form appears with information to be filled in at step 814. The type of information requested will necessarily vary depending upon the respective technology family chosen by the supplier. A supplier has the option of attaching files to the survey form, if there is further technical information that is only contained in local files (not shown). At step 816 the supplier completes the survey form.

A supplier choosing to view or edit an existing survey entry clicks on the title of the survey in the view of all survey entries at step 818. This will present the survey in read-only mode initially, similar to the technology survey window 700 of FIG. 7 at step 820. The supplier may then either click the "Back" button on his browser to return to the list, or click the "Edit" button at step 822 to make changes or additions to the survey. This represents the existing information in a form for editing.

Each time a survey form is being edited, whether existing or new, the DTN tool sets the survey editing function to "Draft" mode at step 824. Draft mode allows a supplier to save work prior to completion, if further information needs to be gathered prior to finishing the survey at step 826. When the supplier selects "Final", the survey is saved at step 828, and automatic notification occurs. A lookup table is available in the technology surveys database which links particular technology families with individual procurement engineers of organization 102 (not shown). Notification of a "final" saved survey is automatically sent to the appropriate procurement engineer by email for review and rating at step 830.

After saving the survey, the supplier is re-directed back to the view showing the complete list of survey entries at step 832. Whether the survey was marked draft or final, the survey response is made available to the organization's users as soon as scheduled firewall replication occurs. Suppliers have access 24 hours a day to add, update, and change their information. Since the organization's procurement engineers use the DTN tool exclusively to mark and distribute the list of preferred technologies and suppliers, suppliers are more willing to submit information through the tool. Since the information is available to all of the organization's development engineers, the supplier users also recognize the DTN tool as an efficient use of their time as a marketing tool.

Figure 9:
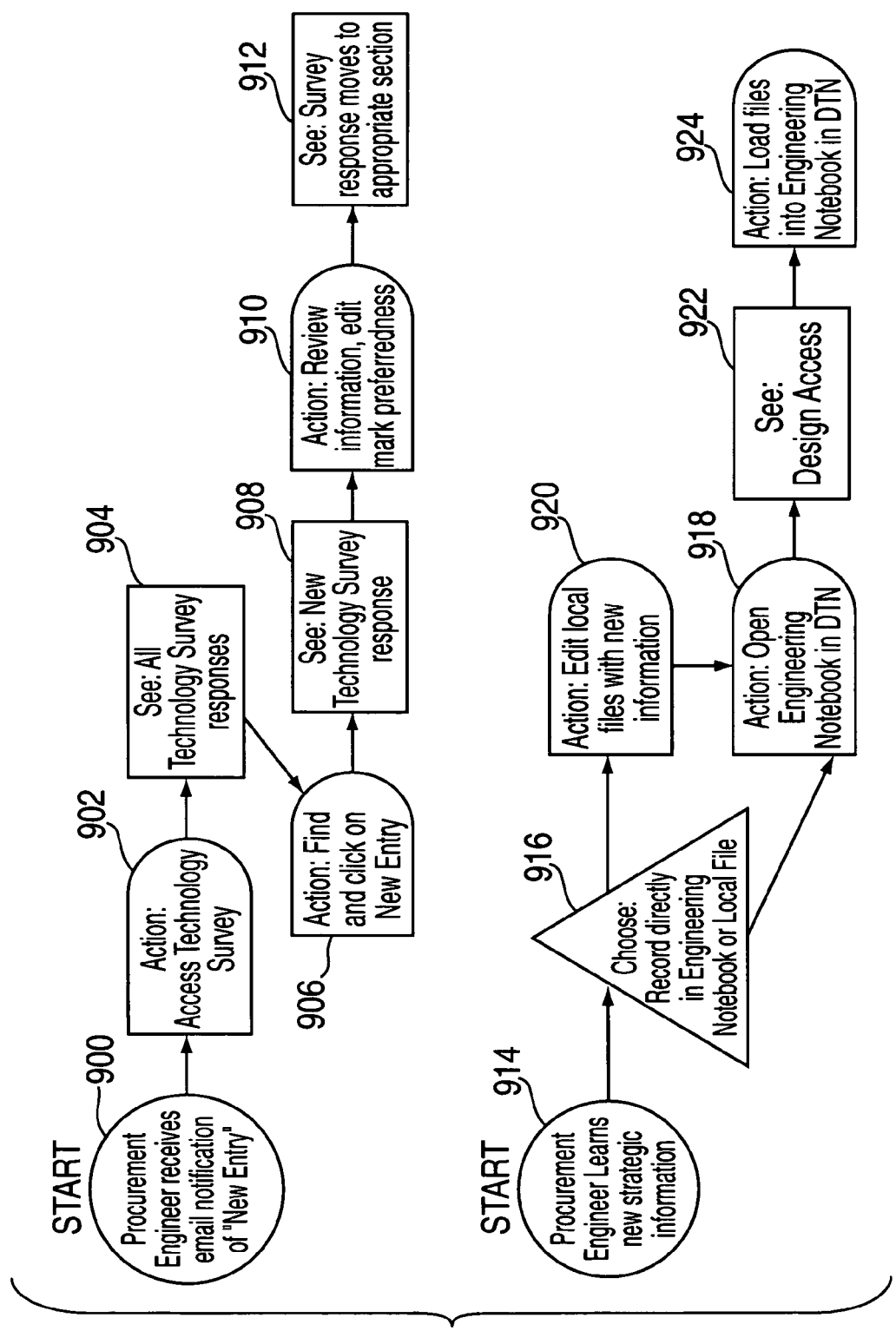
FIG. 9 is a flowchart describing how a procurement engineer provides new technology information to an organization via the DTN tool.

FIG. 9 illustrates the flow of information from the point of view of a procurement engineer. The two main functions for procurement engineers are to (1) review the entries provided by suppliers, and provide feedback and preferredness ratings, and (2) input new technical-intelligence information into the DTN engineering notebook.

A procurement engineer reviews new supplier entries as described herein. When a supplier marks a technology survey as "Final" and selects "Save" as described in FIG. 8, an email/notification is automatically sent to the engineer responsible for that technology family alerting him/her of the new information at 900. In the supplier comparison view of FIG. 6 that the development engineer sees, this new survey is marked "New Entry" (not shown) and is separated from the rest of the information. This informs the user that the data provided by the supplier has not yet been validated, nor has the supplier's preferredness status been marked.

The procurement engineer accesses the technology survey database in data storage device 120 through Lotus Notes (TM) at step 902 and views all of the technology survey responses at step 904. The procurement engineer then clicks on the new entry title at 906, and the selected technology survey response is displayed at step 908. The engineer reviews and edits the information at 910. There are several types of information for the procurement engineer to complete, such as feedback to the supplier, (e.g., giving opinions of the product); assessments (e.g., an engineering assessment for an organization's development engineer); preferred supplier, (e.g., whether the supplier is preferred for the family); and preferred technology family (e.g., whether the technology is preferred to other similar types). When the supplier or technology family is marked "preferred", the survey entry in the view is automatically re-categorized to alert a development engineering user of the information at step 912.

A procurement engineer may also learn of new technology from sources other than supplier surveys (step 914). In this instance, the engineer can chose to either record the new information either directly via the engineering notebook database of the DTN tool or through local files replicated to a remote device at step 916. If the engineer is situated at workstation 114 within organization's 102 intranet 112, the direct method is typically used at step 918 whereby the new information is edited directly via the DTN tool and updates are immediately reflected in the system. If the engineer choosees to provide updates via a remote device at step 920, the changes would not be replicated to the appropriate database of organization 102. The engineer would still be required to open the engineering notebook database of the DTN tool as indicated in step 918, select the design access option at step 922, and load the appropriate updated files into the engineering notebook at step 924. The engineering notebook contains the technical intelligence for the organization's future direction in a particular technology. The structure of the engineering notebook is customizable, and typically contains the following Lotus Notes (TM) design elements: navigators, where links may be placed over a chart or picture; and free-form pages that may be updated with text, picture, and OLE-enabled documents.

The DTN tool provides continuous access to the most complete information on product offerings and technology, enabling an organization to better understand market and technology trends, and deliver consistent information to all necessary parties. The DTN tool's subcomponents; namely, the DTN front end, engineering notebook, and technology surveys features facilitate this information delivery by integrating dynamic product and technology data received from a variety of sources into a single, centralized system.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for facilitating product development and procurement functions in a communications network environment, comprising:
   receiving a request from a first enterprise system to contact a web site maintained by a second enterprise system;
   said second enterprise system authenticating a user ID and password of a user of said first enterprise system;
   in response to receiving a request to complete a survey, providing the first enterprise system with access to a survey form stored in a database that is replicated at the second enterprise system;
   receiving response data solicited in the survey form; and
   updating a database at the second enterprise system with the response data, the updating including storing the response data in one of a draft mode and a final mode designated by the first enterprise system;
   wherein said second enterprise system includes a development toolkit network tool for executing product development and procurement activities.

2. The method of claim 1, further comprising:
   in response to receiving a request to view a completed survey, replicating a database associated said second enterprise system resulting from the request to view a completed survey;
   providing access to said database;
   displaying a list of surveys, said surveys previously completed by said first enterprise system;
   retrieving one of said surveys from said database in response to a request to view a selected survey; and
   displaying said selected survey.

3. The method of claim 1, wherein the receiving a request to complete a survey includes:
   receiving a request to select a survey type from a list of survey type options; and
   associating said survey form with a technical representation of said second enterprise system.

4. The method of claim 1, further comprising:
   receiving an attached file with said response data.

5. The method of claim 1, wherein said storing said survey form in a draft mode occurs at said second enterprise system.

6. The method of claim 1, wherein said storing said survey form a final mode occurs at said second enterprise system.

7. The method of claim 1, wherein said storing said survey form in said final mode includes:
   transmitting a notification to a representative of said second enterprise system; and
   making available said survey form to said second enterprise system.

8. The method of claim 3, further comprising:
   receiving a request to access a stored survey form from said database;
   retrieving said stored survey form from said database;
   transmitting said stored survey form to said first enterprise system, said first enterprise editing said stored survey form;
   receiving edits to said stored survey form; and
   storing said survey form in said database.

9. The method of claim 8, wherein said editing is in a draft mode.

10. The method of claim 8, wherein said transmitting said survey form includes replicating said database to said second enterprise system and designating said survey form as a new entry.

11. The method of claim 8, wherein said storing said survey form includes storing said survey form in a final mode.

12. The method of claim 11, wherein said storing said survey form in said final mode causes a notification to be transmitted to a representative of said second enterprise system.

13. The method of claim 1, wherein said communications network environment includes an extranet.

14. The method of claim 1, wherein said authenticating said user ID and said password is accomplished via a firewall.

15. The method of claim 1, wherein said user is a supplier.

16. A method for facilitating product development and procurement functions in a communications network environment, comprising:
   receiving a notification by a remote user of a second enterprise system, said notification including data relating to a supplier survey, the notification generated in response to an assignment of a final mode designator to the supplier survey; wherein the designator is assigned by a first enterprise system;
   receiving a request to access a replicated database associated with said second enterprise system, said replicated database storing said supplier survey;

authenticating a user ID and a password of said remote user;
providing access to said replicated database;
displaying said supplier survey;
evaluating supplier input entered into the supplier survey;
providing evaluation results into a remote device operated by said remote user; and
storing said data;
wherein said enterprise system includes a development toolkit network tool for executing product development and procurement activities.

17. The method of claim 16, wherein said receiving said notification is via an electronic mail.

18. The method of claim 16, wherein said replicated database resides on a remote device.

19. The method of claim 16, wherein said entering said data includes providing feedback information to a supplier, said supplier associated with said supplier survey.

20. The method of claim 16, wherein said entering said data includes rating said supplier survey.

21. The method of claim 20, wherein said rating includes providing markings to said survey, said markings designating a preferred status.

22. A method for facilitating product development and procurement functions in a communications network environment, comprising:
receiving a request to access a database associated with an enterprise system by a remote user;
authenticating a user ID and a password of said remote user;
replicating said database to a second database of said enterprise system;
providing access to said second database;
receiving a request for a technology menu, said menu comprising at least one technology type;
transmitting said technology menu via said network;
receiving a request for a display of technology sub-types from said at least one technology type;
receiving said display via said network wherein said technology sub-types include at least one technology family;
receiving a request for data corresponding to said at least one technology family; and
transmitting said data corresponding to said at least one technology family; wherein said data includes at least one technology supplier; and
wherein further, said enterprise system includes a development toolkit network tool for executing product development and procurement functions.

23. The method of claim 22, wherein said technology menu, said technology types, and said technology sub-types are retrievable from a first database.

24. The method of claim 22, wherein said data corresponding to said at least one technology family is retrievable from a second database.

25. The method of claim 22, further comprising:
receiving a request for data corresponding to said at least one technology supplier, said data including an item from said supplier technology comparison list; and
transmitting a technology survey response.

26. The method of claim 25, wherein said technology survey response is rated, said survey including preferredness designations.

27. The method of claim 26, wherein said designations are provided by a procurement engineer of said enterprise system.

28. The method of claim 25, wherein said technology survey response is not rated.

29. The method of claim 22, further comprising:
transmitting a hypertext link from said technology survey response, said link corresponding to a supplier's web site.

30. The method of claim 22, wherein said providing access to said database includes replicating said database to a second database.

31. The method of claim 22, wherein said request for said data is initiated by a development engineer of said second enterprise system.

32. The method of claim 22, wherein said communication network environment is an intranet.

33. A system for facilitating product development and procurement functions in a network environment, comprising:
a host system including a web server, an applications server, and a database server;
a first data storage device in communication with said host system;
a second data storage device in communication with said host system;
a development toolkit network application being executed by said host system;
a firewall in communication with said host system;
a workstation; and
a computer network connecting the host system to the workstation;
wherein the development toolkit network application performs:
in response to receiving a request from the workstation to complete a survey, providing the workstation with access to a survey form stored in a database associated with the second storage device, the database replicated at the second enterprise system;
receiving response data solicited in the survey form; and
updating the second database with the response data, the updating including storing the response data in one of a draft mode and a final mode designated by the first enterprise system.

34. The system of claim 33, wherein a front end database is stored in said first data storage device.

35. The system of claim 33, wherein an engineering notebook database is stored in said first data storage device.

36. The system of claim 33, wherein a technology survey database is stored in said second data storage device.

37. The system of claim 34, wherein said front end database is replicated to a remote network device.

38. The system of claim 35, wherein said engineering notebook database is replicated to a remote network device.

39. The system of claim 36, wherein said technology survey database is replicated to a remote network device over an extranet network connection.

40. The system of claim 34, wherein said front end application includes a technology selector application.

41. The system of claim 35, wherein said engineering notebook application includes a road maps application.

42. The system of claim 36, wherein said technology surveys database includes a supplier comparison application.

43. The system of claim 36, wherein said technology surveys database includes a supplier technology survey application.

44. A storage medium encoded with machine-readable computer program code for facilitating product development and procurement functions in a communications network environment, including a first enterprise system and a second enterprise system, the storage medium including instructions for causing said second enterprise system to implement a method, comprising:

receiving a request from a first enterprise system to contact a web site maintained by a second enterprise system;

said second enterprise system authenticating a user ID and password of a user of said first enterprise system;

in response to receiving a request to complete a survey, providing said first enterprise system with access to a survey form stored in a database that is replicated at the second enterprise system;

receiving response data solicited in the survey form; and updating a database at the second enterprise system with the response data, the updating including storing the response data in one of a draft mode and a final mode designated by the first enterprise system;

wherein said second enterprise system includes a development toolkit network tool for facilitating communication between said first enterprise and said second enterprise, and wherein further, said development toolkit network tool executes product development and procurement activities.

45. The storage medium of claim 44, further comprising instructions for causing said second enterprise system to implement:

in response to receiving a request to view a completed survey, replicating a database associated with said second enterprise system resulting form the request to view a completed survey;

providing access to said database;

displaying a list of surveys, said surveys previously completed by said first enterprise system;

retrieving one of said surveys from said database in response to a request to view a selected survey; and displaying said selected survey.

46. The storage medium of claim 44, wherein the receiving a request to complete a survey includes:

receiving a request to select a survey type from a list of survey type options; and associating said survey form with a technical representative of said second enterprise system.

47. The storage medium of claim 44, further comprising instructions for causing said second enterprise system to implement:

receiving an attached file with said response data.

48. The storage medium of claim 44, wherein said storing said survey form in a draft mode occurs at said second enterprise system.

49. The storage medium of claim 44, wherein said storing said survey form in a final mode occurs at said second enterprise system.

50. The storage medium of claim 44, wherein said storing said survey form in said final mode includes:

transmitting a notification to a representative of said second enterprise system; and making said survey form available to said second enterprise system.

51. The storage medium of claim 46, further comprising instructions for causing said second enterprise system to implement:

receiving a request to access a stored survey form from said database;

retrieving said stored survey form from said database;

transmitting said stored survey form to said first enterprise system, said first enterprise system editing said stored survey form;

receiving edits to said stored survey form; and storing said survey form in said database.

52. The storage medium of claim 51, wherein said editing is in a draft mode.

53. The storage medium of claim 51, wherein said transmitting said survey form includes replicating said database to said second enterprise system and designating said survey form as a new entry.

54. The storage medium of claim 51, wherein said storing said survey form includes storing said survey form in a final mode.

55. The storage medium of claim 54, wherein said storing said survey form in said final mode causes a notification to be transmitted to a representative of said second enterprise system.

56. The storage medium of claim 44, wherein said communications network environment includes an extranet.

57. The storage medium of claim 44, wherein said authenticating said user ID and said password is accomplished via a firewall.

58. The storage medium of claim 44, wherein said user is a supplier.

59. A storage medium encoded with machine-readable computer program code for facilitating product development and procurement functions in a communications network environment, the storage medium including instructions for causing an enterprise system to implement a method, comprising:

receiving a notification by a remote user of second enterprise system, said notification including data relating to a supplier survey, the notification generated in response to an assignment of a final mode designator to the supplier survey; wherein the designator is assigned by a first enterprise system;

receiving a request to access a replicated database associated with said second enterprise system, said replicated database storing said supplier survey;

authenticating a user ID and a password of said remote user;

providing access to said replicated database;

displaying said supplier survey;

evaluating supplier input entered into the supplier survey;

providing evaluation results into a remote device operated by said remote user; and storing said data;

wherein said enterprise system includes a development toolkit network tool for executing product development and procurement activities.

60. The storage medium of claim 59, wherein said receiving said notification is via an electronic mail.

61. The storage medium of claim 59, wherein said replicated database resides on a remote device.

62. The storage medium of claim 59, wherein said entering said data includes providing feedback information to a supplier, said supplier associated with said supplier survey.

63. The storage medium of claim 59, wherein said entering said data includes rating said supplier survey.

64. The storage medium of claim 63, wherein said rating includes providing markings to said survey, said markings designating a preferred status.

65. A storage medium encoded with machine-readable computer program code for facilitating product development and procurement functions in a communications network environment, including a first enterprise system and a second enterprise system, the storage medium including instructions for causing said second enterprise system to implement a method, comprising:

receiving a request to access a database associated with an enterprise system by a remote user;

authenticating a user ID and a password of said remote user;

replicating said database to a second database of said enterprise system;

providing access to said second database;

receiving a request for a technology menu, said menu comprising at least one tehcnoloyg type;

transmitting said technology menu via said network;

receiving a request for a display of tehcnoloyg sub-types from said at lest one tehcnoloyg type;

receiving said display via said network wherein said technology sub-types include at least one technology family;

receiving a request for data corresponding to said at least one technology family; and transmitting said data corresponding to said at least one tehcnoloyg family; wherein said data includes at least one technology supplier; and wherein further, said enterprise system includes a development toolkit network tool for executing product development and procurement functions.

66. The storage medium of claim 65, wherein said technology menu, said technology types, and said technology sub-types are retrievable from a first database.

67. The storage medium of claim 65, wherein said data corresponding to said at least one technology family is retrievable from a second database.

68. The storage medium of claim 65, further comprising instructions for causing said enterprise system to implement:

requesting data corresponding to said at least one technology supplier, said data including an time from said supplier technology comparison list; and viewing a technology survey response.

69. The storage medium of claim 68 wherein said technology survey response is rated, said survey including preferredness destinations.

70. The storage medium of claim 69 wherein said designations are provided by a procurement engineer of said second enterprise system.

71. The storage medium of claim 69 wherein said technology survey response is unrated.

72. The storage medium of claim 65, further comprising instructions for causing said enterprise system to implement:

providing a hypertext link from said technology survey response, said link corresponding to a supplier's web site.

73. The storage medium of claim 65, wherein said storing said data includes replicating databases of said network system.

74. The storage medium of claim 65, wherein said requesting said data and viewing said supplier survey response is initiated by a development engineer of said second enterprise system.

75. The storage medium of claim 65, wherein said communications network environment is an intranet.

76. A method for facilitating product development and procurement functions in a communications network environment, comprising:

receiving product data and technical information from a plurality of supplier entities via a supplier survey database, the supplier survey database replicated for each of the plurality of supplier entities;

associating the product data and technology information with a procurement specialist and providing the procurement specialist with access to the product data and tecnical information for analysis;

receiving results of the analysis from the procurement specialist, the results including preferred technology recommendations and preferred supplier recommendations;

integrating the product development and technical information with the results and with a parts repository resulting in a technical roadmap guide; and providing a development engineer with access to the technical roadmap guide.

77. A storage medium encoded with machine-readable program code for facilitating product development and procurement functions in a communications network environment, the program code including instructions for causing a host system to implement a method, comprising:

receiving product data and technical information from a plurality of supplier entities via a supplier survey database, the supplier survey database replicated for each of the plurality of supplier entities;

associating the product data and tehcnoloyg information with a procurement specialist and providing the procurement specialists with access to the product data and technical information for analysis;

receiving results of the analysis from the procurement specialist, the results including preferred technology recommendations and preferred supplier recommendations;

integrating the product development and tecnical information with the results and with a parts repository resulting in a technical roadmap guide; and providing a development engineer with access to the technical roadmap guide.

\* \* \* \* \*